US010547682B2

United States Patent
Suter et al.

(10) Patent No.: US 10,547,682 B2
(45) Date of Patent: Jan. 28, 2020

(54) DYNAMICALLY SCALING APPLICATION COMPONENTS USING MICROSERVICES

(71) Applicant: ADOBE INC., San Jose, CA (US)

(72) Inventors: Philipp Suter, Zurich (CH); Carsten Ziegeler, Paderborn (DE); Allaert Joachim David Bosschaert, Dublin (IE)

(73) Assignee: Adobe Inc., San Jose, CA (US)

( * ) Notice: Subject to any disclaimer, the term of this patent is extended or adjusted under 35 U.S.C. 154(b) by 503 days.

(21) Appl. No.: 15/348,876

(22) Filed: Nov. 10, 2016

(65) Prior Publication Data

US 2018/0131764 A1    May 10, 2018

(51) Int. Cl.
*H04L 29/08* (2006.01)
*G06F 9/54* (2006.01)

(52) U.S. Cl.
CPC .......... *H04L 67/1097* (2013.01); *G06F 9/546* (2013.01); *H04L 67/16* (2013.01)

(58) Field of Classification Search
CPC ..... G06N 7/005; G06F 9/546; H04L 67/1097; H04L 67/16
See application file for complete search history.

(56) References Cited

U.S. PATENT DOCUMENTS

| | | | | |
|---|---|---|---|---|
| 8,856,797 | B1* | 10/2014 | Siddiqui | G06F 9/46 718/104 |
| 10,169,065 | B1* | 1/2019 | Nye | G06F 9/45558 |
| 2009/0063655 | A1* | 3/2009 | Little | G06F 9/546 709/218 |
| 2010/0251327 | A1* | 9/2010 | Channabasavaiah | H04L 63/20 726/1 |
| 2011/0296025 | A1* | 12/2011 | Lieblich | G06F 9/5027 709/226 |
| 2012/0137003 | A1* | 5/2012 | Ferris | H04L 67/16 709/226 |
| 2014/0101237 | A1* | 4/2014 | Chan | H04L 67/1097 709/203 |
| 2015/0347183 | A1* | 12/2015 | Borthakur | G06F 9/4856 718/105 |

\* cited by examiner

*Primary Examiner* — Gil H. Lee
(74) *Attorney, Agent, or Firm* — Brake Hughes Bellermann LLP

(57) ABSTRACT

Techniques disclosed herein dynamically scale components of an application using microservices. An exemplary technique involves executing the application on a computing device such as a server. For example, the application can be executed to host server-side services using the components of the application locally on the computing device. The technique monitors use of the components during execution of the application and determines to migrate a component to a microservice based on the use of the component during the execution of the application. The technique then migrates the component to a micro service by initiating launch of the micro service on a remote computing device and converting local calls for the component to remote calls for the microservice in the application.

17 Claims, 7 Drawing Sheets

DYNAMICALLY SCALING APPLICATION COMPONENTS USING MICROSERVICES

TECHNICAL FIELD

This disclosure relates generally to computer-implemented techniques and more particularly relates to improving the efficiency and effectiveness of computing systems used to scale applications using microservices.

BACKGROUND

Scalability is the capability of a computer application to handle a growing amount of work, or its potential to be enlarged in order to accommodate that growth. One way of scaling applications is by distributing application components across multiple computing devices (hosts/machines) and making these available remotely as microservices. The application can then use these microservices via a protocol such as REST/HTTP or other protocol to provide their functionality and as such spread the load to other entities to achieve scaling.

Existing scaling techniques require that the microservices of an application be designated and configured prior to the application's launch. However, applications often contain many components and it is not always clear in advance which components should be scaled. This is in part because the application load on the different components of the application depends on how the application will actually be used, which is both unknown and variable over time. It is thus often not known in advance which component should be implemented as microservices. Nor is implementing all components in the system as microservices appropriate because the remote nature of the microservices adds a significant protocol overhead cost. Components that do not put a significant load on the system are more efficiently implemented locally than as microservices to avoid the overhead cost. Thus, it is generally desirable to only implement microservices for components in circumstances where the load reduction benefit of doing so outweighs the protocol overhead cost. However, since the load on the various components of the application is unknown in advance and variable over time, people have had to make subjective guesses about which components should be scaled. The result is that running applications use microservices inefficiently. Significant additional engineering time and efforts and application disruptions are required to refactor components as microservices and vice versa. This time, effort, and disruption make it impractical to refactor components generally and infeasible to do so based on changing load conditions over time.

SUMMARY

Techniques disclosed herein dynamically scale components of an application using microservices. An exemplary technique involves executing the application on a computing device such as a server. For example, the application can be executed to host server-side services using the components of the application locally on the computing device. The technique monitors use of the components during execution of the application and determines to migrate a component to a microservice based on the use of the component during the execution of the application. The technique then migrates the component to a micro service by initiating launch of the micro service on a remote computing device and converting local calls for the component to remote calls for the microservice in the application.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
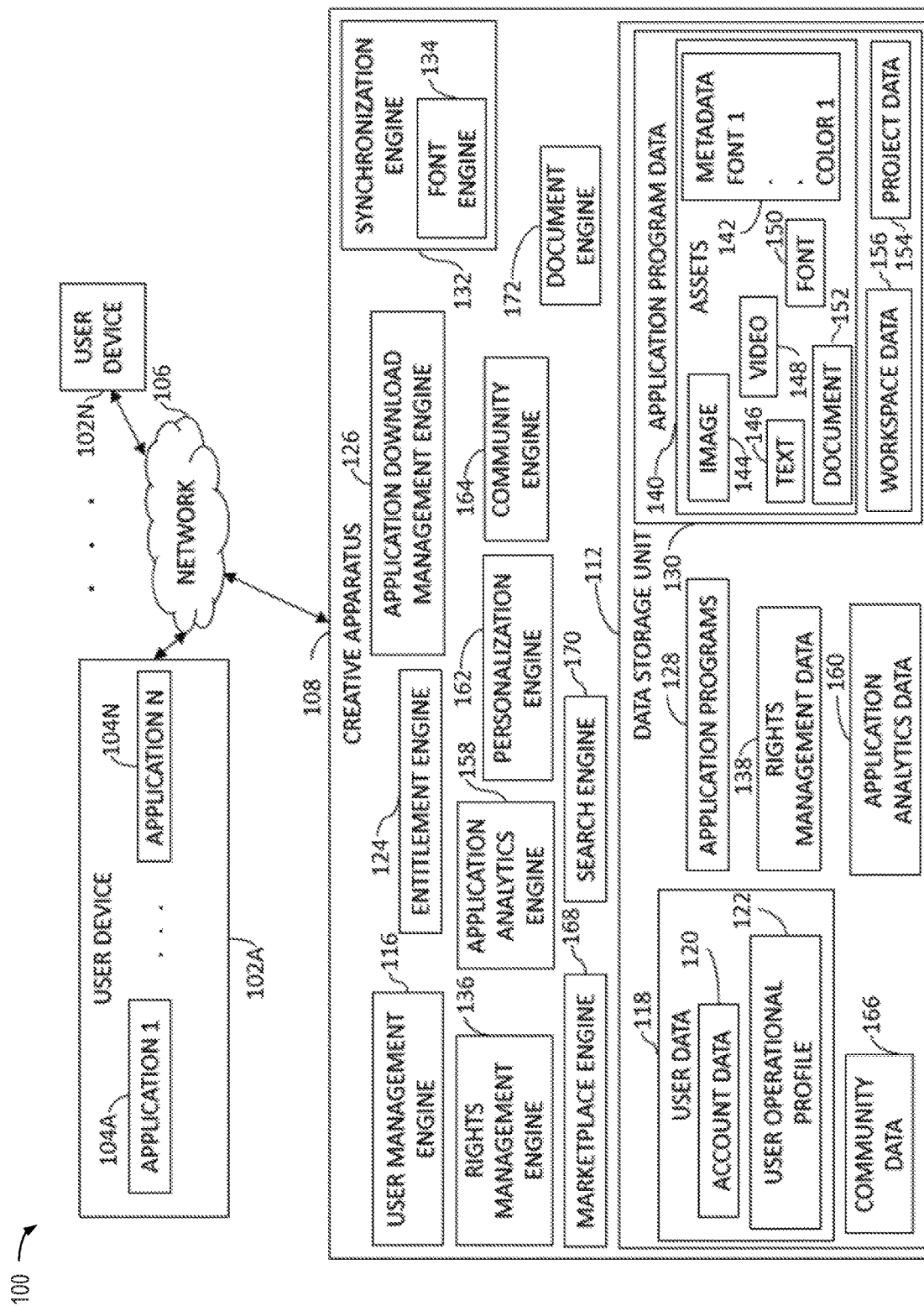
FIG. 1 is a diagram of an environment in which one or more techniques of the invention can be practiced.

As discussed above, existing application scaling techniques require that the microservices of an application be designated and configured prior to the application's launch. Existing techniques also require significant development effort and disruption to the application to refactor components after the application is launched. Techniques of the invention provide ways to implement an application such that any of its components can be turned into microservices, and vice versa, at runtime.

In one example, when an application is initially deployed, all of the application components are deployed as local components. Thus, initially none of the components introduce the protocol overhead of microservices. During runtime, a component usage detector executes to monitor conditions and select components to migrate to microservices and vice versa. Specifically, based on utilization/load information and overhead costs, the component usage detector determines to migrate components that place significant load on the application to be migrated to be microservices. For example, the component usage detector can determine that the wait time for a particular local component exceeds a threshold and thus the load reduction benefit of migrating the component to be a microservice justifies the overhead protocol costs of doing so. Other components in the application that use the newly migrated microservices automatically change the way they invoke these components from local calls to remote calls. Conversely, when a microservice's use no longer justifies the overhead costs, a usage detector migrates the microservice to a local service. As the application runs, it thus uses a combination of some local components and some microservices that is dynamically adjusted to account for the changing load conditions on the system's local components and microservices.

The efficiency of an application is improved by dynamic selecting components to be local components or microservices during runtime. The selection of components to be local components or microservices can be made based on criteria selected to control the load on the application while accounting for the overhead costs of using the microservices. The application is thus able to achieve scalability to significantly reduce load, while efficiently managing the microservice overhead costs. In one technique of the invention, all components of the application are candidates to be migrated to microservices. However, individual components can remain local until conditions justify microservice migration to avoid unnecessarily paying the protocol overhead cost associated with microservices for all components in the system.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, gaming devices, smart watches, cloud computing resources, virtual machines, etc.

As used herein, the phrase "application" refers to a computer program designed to perform a group of coordinated functions, tasks, or activities for one or more users or initiated automatically by another application or automated process. Applications are executed on one or more computing devices, such as one or more servers. The functions, tasks, and activities provided by applications include, but are not limited to, work processing, spreadsheet processing, accounting, web page hosting, media playing, simulation, gaming, computation, video processing, data processing, file sharing, file storage, and many others.

As used herein, the phrase "component" refers to a module, resource, or other part of an application that provides a function, task, or other service. An application typically includes many components that collectively provide the group of coordinated functions, tasks, or activities offered by the application. Components can be implemented locally as "local components" or remotely as "microservices." Components can provide services using other components. For example, one component can use a local component by invoking a local call for the other component or use a microservice by invoking a remote call to use the microservice.

As used herein, the phrase "microservice" refers to a component of an application that is configured to be invoked using remote calls from other components of the application. For example, if an instance of an application is executing on a first server, a microservice can be used to provide a component of the application on a remote server that is separate from the first server. Components on the first server can use the microservice via remote calls that are sent to invoke the micro service over the network and then receive responses that are returned over the network.

As used herein, the phrase "local component" refers to a component of an application that is invoked using local calls by other components of the application. For example, if an instance of an application is executing on a first server, a local component can be used to provide a module, resource, or other part of the application on that first server. Other components on the first server can use the local component via local calls that are used to invoke the local component without needing to access a network.

As used herein, the phrase "server-side services" refers to a group of coordinated functions, tasks, or activities provided by one or more servers to one or more users using computing devices as clients. Examples of the server-side services include, but are not limited to, hosting a website, hosting an image, video, or data processing service, hosting a cloud-based file storage service, hosting a cloud-based file sharing service, and/or hosting a cloud-based software tool.

As used herein, the phrase "migrate" refers to converting a component from a local component on a first device to a microservice on a remote computing device, or vice versa. For example, migrating a component to be a microservice can involve launching a microservice by downloading a library containing the microservice on the remote computing device and then launching the microservice so that the microservice is available to receive remote calls via a network, perform functions, tasks, or activities in response to the calls, and/or provide messages with results or other responses to the remote calls via the network.

As used herein, the phrase "dependency" refers to a coupling or relationship in which a component uses another component or other resource. For example, a component may call a second component to perform part of its processing. In this example, identifying the dependencies of the first component would involve identifying that the first component calls the second component.

As used herein, the phrase "library" refers to a collection of components used to develop and/or deploy an application. Components of a library are generally, but not necessarily always, accessible via local and/or remote calls.

As used herein, the phrase "remote call" refers to a call made in a distributed computing system in which one component of an application causes another component to perform a function, task, or service on a remote computing device, e.g., one in another address space or accessed via a network. Remote calls, in some examples, are coded as if they were local calls, without the programmer explicitly coding the details of the remote interaction. The programmer is able to write essentially the same code to initiate a local call or a remote call. In one example, an application uses the same code to call a component regardless of whether a component is implemented as a local component or a microservice and a service registry is used to dispatch calls to the component as either to a local component or to a microservice depending upon dynamic (i.e., changeable during execution) parameters in the service registry.

As used herein, the phrase "service registry" refers to information that is used by an application to determine how to process calls to components. In one example, a parameter in the service registry for a component specifies if a call for the component is to be implemented using a local call to a local component or a remote call to a microservice. A service registry, in this example, can be used to identify a stub component to implement a call to a component as a remote call.

As used herein, the phrase "stub" refers to software code that is used to stand in for some other programming functionality such as a local component. Rather than perform the functions of component, a stub can be used to receive a call and translate the call in to an appropriate remote call to a microservice. Thus, when a component is migrated to a microservice, a stub can be enabled to receive calls for the component and translate the calls into messages that are sent over the network to the microservice.

Exemplary Computing Environments for Scaling Applications

FIG. 1 is a diagram of an environment 100 in which one or more embodiments of the present disclosure can be practiced. The environment 100 includes one or more user devices, such as a user device 102A up to a user device 102N. Each of the user devices is connected to a creative apparatus 108 via a network 106. Users of the user devices uses various products, applications, or services supported by the creative apparatus 108 via the network 106. The user devices correspond to various users. Examples of the users include, but are not limited to, creative professionals or hobbyists who use creative tools to generate, edit, track, or manage creative content, end users, administrators, users who use document tools to create, edit, track, or manage documents, advertisers, publishers, developers, content owners, content managers, content creators, content viewers, content consumers, designers, editors, any combination of these users, or any other user who uses digital tools to create, view, edit, track, or manage digital experiences.

Digital tool, as described herein, includes a tool that is used for performing a function or a workflow electronically. Examples of the digital tool include, but are not limited to, content creation tool, content editing tool, content publishing tool, content tracking tool, content managing tool, content printing tool, content consumption tool, content transformation tool, any combination of these tools, or any other tool that can be used for creating, editing, managing, generating, tracking, consuming or performing any other function or workflow related to content. Digital tools include the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, data repository data, any combination of one or more content, or any other electronic content.

Examples of the user devices 102A-N include, but are not limited to, a personal computer (PC), tablet computer, a desktop computer, a processing unit, any combination of these devices, or any other suitable device having one or more processors. Each user device includes at least one application supported by the creative apparatus 108.

It is to be appreciated that the following description is now explained using the user device 102A as an example and any other user device can be used.

Examples of the network 106 include, but are not limited to, internet, local area network (LAN), wireless area network, wired area network, wide area network, personal area network (PAN), and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases, repositories, file systems, or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription account and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

The user management engine 116 and the entitlement engine 124 can be one single engine performing the functionalities of both the engines.

The user then installs various applications supported by the creative apparatus 108 via an application download management engine 126. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide the login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 112 by a synchronization engine 132. The synchronization engine 132 also includes a font engine 134 for synchronizing or storing fonts included as part of the application program data 130. The application program data 130 can be specific to the user or can be shared with other users based on rights management. The rights management is performed by a rights management engine 136. Rights management rules or criteria are stored as rights management data 138 in the data storage unit 112.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one embodiment, each asset also includes a file. Examples of the file include, but are not limited to, an image 144, text 146, a video 148, a font 150, a document 152, a combination of any of these, and the like. In another embodiment, an asset only includes the metadata 142.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in other embodiment.

The user can have one or more user devices. The application program data 130 is accessible by the user from any device, i.e. including the device which was not used to create the assets 140. This is achieved by the synchronization engine 132 that stores the application program data 130 in the data storage unit 112 and makes the application program data 130 available for access by the user or other users via any device. Before accessing the application program data 130 by the user from any other device or by any other user, the user or the other user may need to provide login details for authentication if not already logged in. Else, if the user or the other user are logged in then a newly created asset or updates to the application program data 130 are provided in real time. The rights management engine 136 is also called to determine whether the newly created asset or the updates can be provided to the other user or not. The workspace data 156 enables the synchronization engine 132 to provide same workspace configuration to the user on any other device or to the other user based on the rights management data 138.

In various embodiments, various types of synchronization can be achieved. For example, the user can pick a font or a color from the user device 102A using a first application program and can use the font or the color in a second application program on any other device. If the user shares the font or the color with other users, then the other users can also use the font or the color. All this synchronization can happen in real time. Similarly, synchronization of any type of the application program data 130 can be performed.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" maximum number of times. The output of the application analytics engine 158 is used by a personalization engine 162 to personalize tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and the options are provided to the user for publishing using the digital publishing application or any other application. In addition, while preparing the article, recommendations can also be made by the synchronization engine 132 to incorporate some of other assets saved by the user and relevant for the article. Such recommendations can be generated using one or more engines as described herein.

The creative apparatus 108 also includes a community engine 164 which enables creation of various communities and collaboration among the communities. A community, as described herein, includes a group of users that share at least one common interest. The community can be closed, i.e. limited to a number of users or can be open, i.e. anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 works in conjunction with the synchronization engine 132 to provide collaborative workflows to the user. For example, the user can create an image and can request for some expert opinion or expert editing. An expert user can then either edit the image as per the user liking or can provide expert opinion. The editing and providing of the expert opinion by the expert is enabled using the community engine 164 and the synchronization engine 132. In collaborative workflows, each of a plurality of users are assigned different tasks related to the work.

The creative apparatus 108 also includes a marketplace engine 168 for providing a marketplace to one or more users. The marketplace engine 168 enables the user to offer an asset for sale or use. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

The creative apparatus 108 also includes a document engine 172 for providing various document related workflows, including electronic or digital signature workflows, to the user. The document engine 172 can store documents as the assets 140 in the data storage unit 112 or can maintain a separate document repository (not shown in FIG. 1).

It is to be appreciated that the engines and working of the engines are described as examples herein and the engines can be used for performing any step in providing digital experience to the user.

Figure 2:
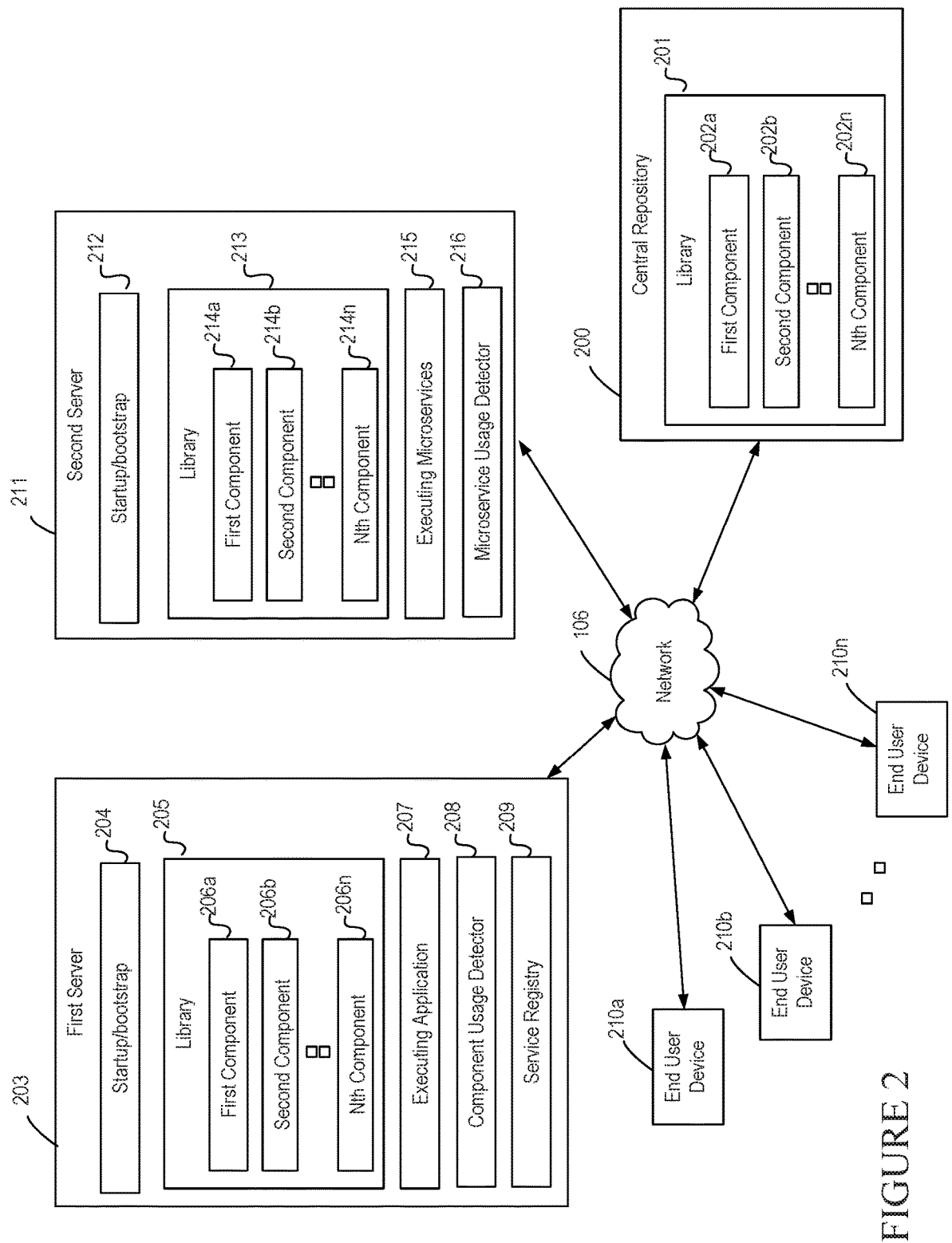
FIG. 2 illustrates a computing environment for executing an application using local components on a first server and microservices on a second server.

The digital experience provided by creative apparatus 108 can be provided using an application that is dynamically scaled using multiple computing devices, for example, as explained with respect to the computing environment of FIG. 2.

FIG. 2 illustrates a computing environment for executing an application using local components on a first server and microservices on a second server. In FIG. 2, a central repository holds a library 201 with the components 202a-n of an application. The first server 203 and second server 211 each include a startup/bootstrap module for retrieving and using copies of the library 201 from the central repository when needed. For example, when the application is first deployed. The startup/bootstrap module 204 downloads a copy of library 201 and stores it locally on the first server 203 as library 205 with components 206a-n.

The startup/bootstrap component 204 then initiates executing application 207 using the components 206a-n from the library 205. Since all of the components 206a-n are local to the first server 203, the executing application 207 initially makes local calls from one component to another to provide the features and functions of the executing application 207. In this example, the executing application 207 provides server-side services to end user devices 210a-n via network 106. For example, the executing application 207 may host a website, host an image, video, or data processing service, host a cloud-based file storage service, host a cloud-based file sharing service, and/or host a cloud-based software tool that is accessed by end user devices 210a-n.

End user devices 210a-n, in this example, are able to access these services provided by executing application 207 concurrently. Accordingly, one or more of the components 206a-n providing the services can become overloaded. The component usage detector 208 monitors use of the components 206a-206n and identifies circumstances in which it is advantageous to migrate one or more of the components 206a-n to be microservices on second server 211.

When one or more of the components are to be migrated to be microservices on the second server 211, the first server's component usage detector 208 sends a message to the central repository 200 and/or the second server 211 to initiate the microservices. The second server 211 startup/bootstrap module 212 downloads a copy of the library 201 from the central repository 200 as library 213 with components 214a-n. The startup/bootstrap component 212 then initiates the executing microservices 215 using the components 214a-n. For example, if the first component 214a is to be implemented as a microservice, the executing microservices 215 includes the processing functionality of the first component 214a along with functionality to allow it to receive and respond to remote calls via network 106.

When one or more of the components are to be migrated to be microservices on the second server 211, the first server 203 also changes the application so that local calls for the component are converted to remote calls for a corresponding microservice. In the example of FIG. 2, this is accomplished by modifying service registry 209 to indicate that calls for the component will be handled by the microservice, for example, by referencing a stub that converts a local call into a message to be sent via network 106 to initiate the remote microservice. In alternative implementations, changing the application so that local calls for a component are converted to remote calls for a corresponding microservice involves changing one or more pieces of code, changing one or more data structures, or making another change to the application that is recognized and results in a remote call being made to the microservice instead of a local call to the local component.

When a component is migrated to be a microservice on the second server 211, the corresponding local component on server 203 that is no longer being used can be disabled or even deleted.

The second server 211 also includes a microservice usage detector 216 that monitors use of the executing microservices 215 on the second server 211. The microservice usage detector 216 identifies circumstances in which it is advantageous to migrate one or more of the executing microservices 215 to be local components on the first server 203. For example, if the usage of a microservice drops below a predetermined threshold, the microservice can be migrated to first server 203 to avoid the overhead costs associated with microservices, e.g., data conversion, message formatting, and data transmission costs.

In the example of FIG. 2, the executing application 207 uses many components. Each of these components can be implemented locally on the first server 203 or remotely as a microservice on the second server 211. Initially each of the component 206a-n is local but is also a potential candidate to be converted into a microservice. Thus initially the executing application does not use remote calls. However, the executing application 207 is monitored by the component usage detector and over time components are migrated to be microservices and vice versa in appropriate circumstances. This allows components from the executing application 207 to be migrated to a microservice and vice versa without further development, even at runtime. This provides a very efficient way of scaling the application using actual usage data to decide at runtime which components will be microservices. Moreover, the system dynamically responds to changing conditions over time so that an efficient combination of local components and microservices is always being selected and used. Note that in alternative implementations of the invention, an application is initially deployed with some local components and some microservices, for example, based on initial automated or human predictions of which components are good candidates for microservice implementation. In other implementations, an application is initially deployed with all microservices and no local components. The initial conditions of the application deployment thus can vary depending upon the circumstances.

The dynamic scaling techniques of the invention are applicable on a variety of types of application and are particularly applicable and useful on applications that provide server-side services. Such applications can be provided in cloud computing environments and made accessible by many users simultaneously. Applications that host websites, applications that process submitted tasks, applications that edit and render images, applications that edit and render video, and applications that import, share, and allow collaboration on images, videos, and other electronic assets are examples of applications that can utilize the dynamic scaling techniques of the invention. Numerous other types of applications can as well.

Figure 3:
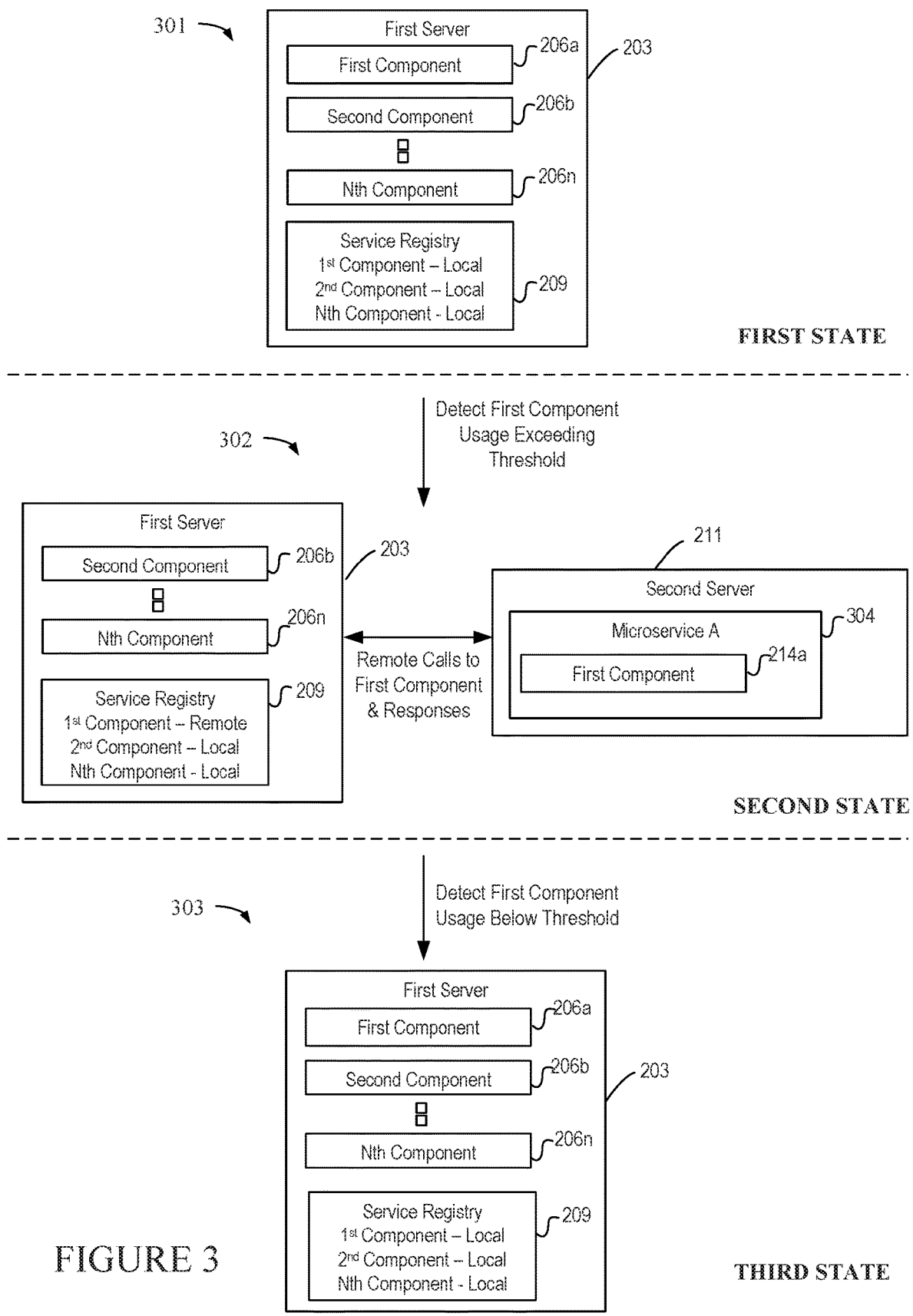
FIG. 3 illustrates an exemplary process in which a component is migrated from a local component to a microservice during the execution of an application.

FIG. 3 illustrates an exemplary process in which a component is migrated from a local component to a microservice during the execution of an application. In this example, the application is initially provided in a first state 301. In this state, all of the components 206a-n of the application are executed as local components on the first server 203. The service registry 207 of the application identifies that calls to each of the components 206a-n are to be sent locally to the respective local component.

In FIG. 3, the exemplary process detects a first component usage exceeding a predetermined threshold and the application is converted to a second state 302. In the second state 302, the first component 206a is migrated to be implemented as a microservice 304 that uses the first component 214 stored on the second server 211. The service registry 209 on the first server 203 is changed to indicate that the first component is implemented remotely as a microservice. In one example, the calls in the application to the first component are not directly changed in the coding of the calls themselves. Rather, the calls to the first component are changed by changing the service registry that is used to interpret the calls. When the service registry 209 indicates a local call (as in the first state 301), the calls to the first component are directed locally to the first component 206a. However, when the service registry 209 indicates that the first component is implemented remotely as a microservice, the calls to the first component are packaged as remote calls to the second server 211 to access the microservice A 304. Accordingly, remote calls to the first component and responses are sent between the first server 203 and the second server 211.

The exemplary process of FIG. 3 next detects that first component usage has fallen below a threshold and changes the state of the application to a third state 303 that migrates the microservice A 304 to a local component on the first server 302. The service registry 209 is changed to again indicate that calls for the first component will be processed locally by first component 206a.

Exemplary Techniques for Dynamically Scaling an Application Using Microservices

Embodiments of the invention provide techniques, systems, and computer-readable mediums with stored instructions that enable the dynamic scaling of an application using microservices. The functions involved in these embodiments of the invention generally involve executing an application on a computing device, hosting server-side services using components of an application locally on the computing device and/or microservices on a remote computing device, and migrating a component of the application to a microservice on a remote computing device, or vice versa, based on use of the component during execution of the application. These functions are generally implemented on one or more computing devices that use one or more processors to execute algorithms of one or more operations defined in stored instructions. The operations of various exemplary algorithms that can be employed to perform these functions are discussed in the FIGURES and throughout this specification.

Dynamic scaling of an application using microservices provides numerous performance advantages and efficiencies. Unlike prior techniques that required microservices to be designed up front, techniques of the invention allow the microservices to be selected and changed during runtime. The application developers are saved the burden of having to make estimates and decisions about which components of an application could receive sufficient load to be implemented as microservices. Moreover, by making the determinations based on actual conditions, the determinations of likely to be more accurate and result in more efficient processing. Additionally, since which components are local and which are microservices is automatically determined during the runtime, the additional potential costs of having to take down and change a running application to refactor the components and microservices are avoided.

In addition, the techniques of the invention avoid using microservices when the circumstances do not justify it. This is significant because it allows the overhead associated with microservice use to be avoided. For example, a process for using a microservice can involve encoding data into a serialized message format, sending the message over to the remote computing device, having the remote computing device reconstruct the data from serialized format, performing the microservice function, creating a response message in serialized format, sending the response message back, and de-serializing the response message. Such processes can be up to 1000 times or more expensive in terms of processing and communication requirements than making a local call.

Techniques of the invention allow a developer of an application to develop all components of the application in the same way without regard to whether the components will be implemented locally or remotely as microservices. Initially, in one embodiment of the invention, all services of the application are implemented locally and the system dynamically changes the components during the execution of the application. Thus, if there is a lot of usage of a particular component, that component is migrated to be a microservice on a separate computing device. This frees up resources, avoids bottlenecks, and ensure the efficient functioning of the application. The dynamic determinations can weigh the processing benefits of the microservice (e.g., reducing the load on the first server, reducing wait times, etc.) with the overhead costs of using the microservice. These determinations are made on a component by component basis. In this way, the techniques ensure the microservices are used for components only when it makes sense to do so.

In sum, the techniques of the invention can avoid the inefficiencies often present in prior techniques because they avoid guesswork and static microservice assignments. Making the wrong choices a priori about which components to scale as microservices using prior techniques resulted in unnecessary overhead, overloaded applications, and/or additional development costs and/or delays to the application deployment. Being able to make these decisions automatically and dynamically on a deployed, executing application ensures that the appropriate components are being scaled when they need to without relying on guesswork, without unnecessary overhead, and without any additional development work.

Figure 4:
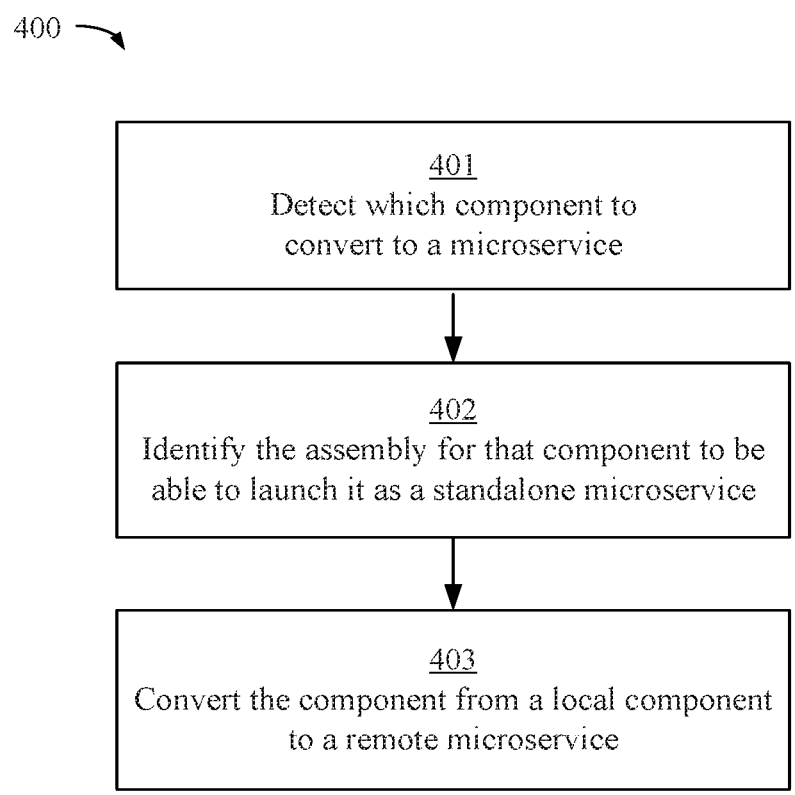
FIG. 4 is a flow chart illustrating an exemplary technique for dynamically scaling application components using microservices.

FIG. 4 is a flow chart illustrating an exemplary technique 400 for dynamically scaling application components using micro services. The exemplary technique 400 can be implemented using servers 203 and 211 of FIG. 2, although other devices and configurations can also be implemented. The exemplary technique 400 can be implemented by storing and executing instructions in a non-transitory computer-readable medium.

Technique 400 involves detecting which component to convert to a microservice, as shown in block 401. This can involve monitoring the resource used by the component and comparing the resource usage with a predetermined threshold. Generally, detecting which component to convert to a microservice can involve monitor something about the provision of a service by a component, a queue associated with a service provided by the component, the efficiency of the component, a wait time associated with the component and/or any other appropriate metric. Such metrics can be compared with a predetermined threshold or other criteria to determine when to migrate a component from a local component to a microservice.

One example of detecting which component to convert involves a component that provides video processing one video after another. To determine whether to convert the component to a microservice, a metric associated with the video processing can be monitored. For example, the technique can monitor a queue of incoming jobs for the video processing component and once the queue goes above a certain threshold, e.g., 10, then the technique determines to scale the video processing component as a microservice, for example, by launch 1, 2, 3, or more of the video processing components remotely as microservices to provide the video processing in parallel. In another example, the technique determines when to convert a component from a local component to a micro service based on a number of users using the component. In this example, when the number of users that use the particular component exceeds a threshold, e.g., 1000 users, the technique determines to migrate the component. In another example, the technique measures the average time it takes to complete a particular function and determines to migrate the component when the time exceeds a predetermined threshold.

In another example, detecting which component to convert to a microservice is based on information received from an external analytics or other information system. For example, an analytics system can be separately used to track user interactions and make predictions about future user interactions. Such a system can provide information that is used to detect which components to convert to a microservice. For example, an analytics system may predict that many users are likely to utilize a particular feature of a webs shop in the next hour and the techniques can determine to scale up the components associated with that web shop in advance of the expected rush based on this information.

Technique 400 further involves identifying an assembly for the component to be able to launch it as a standalone microservice, as shown in block 402. In one embodiment of the invention, this involves determining the dependencies of the component based on declared dependencies. These dependencies can be determined based on each component of the application having declared its dependencies to develop a full graph of dependencies. This dependency graph is used to determine everything needed to create and use the component to be migrated remotely. For example, when component A declares that it depends on component B, a copy of component B will be included in the new microservice for component A. In this example, the application running on first server will still retain its own copy of component B. Thus, if other components of the application use component B, the local copy of component B is used. The microservice, on the other hand, which implements component A remotely will also has its own copy of component B to use remotely and thus will have the full assembly of necessary resources to perform its task, function, or other service.

Technique 400 further involves converting the component from being a local component to be a remote microservice, as shown in block 403. In one example, this involves launching the microservice on a remote computing device and then making changes in the local application so that remote calls will be used instead of (or in addition to) the local component.

Figure 5:
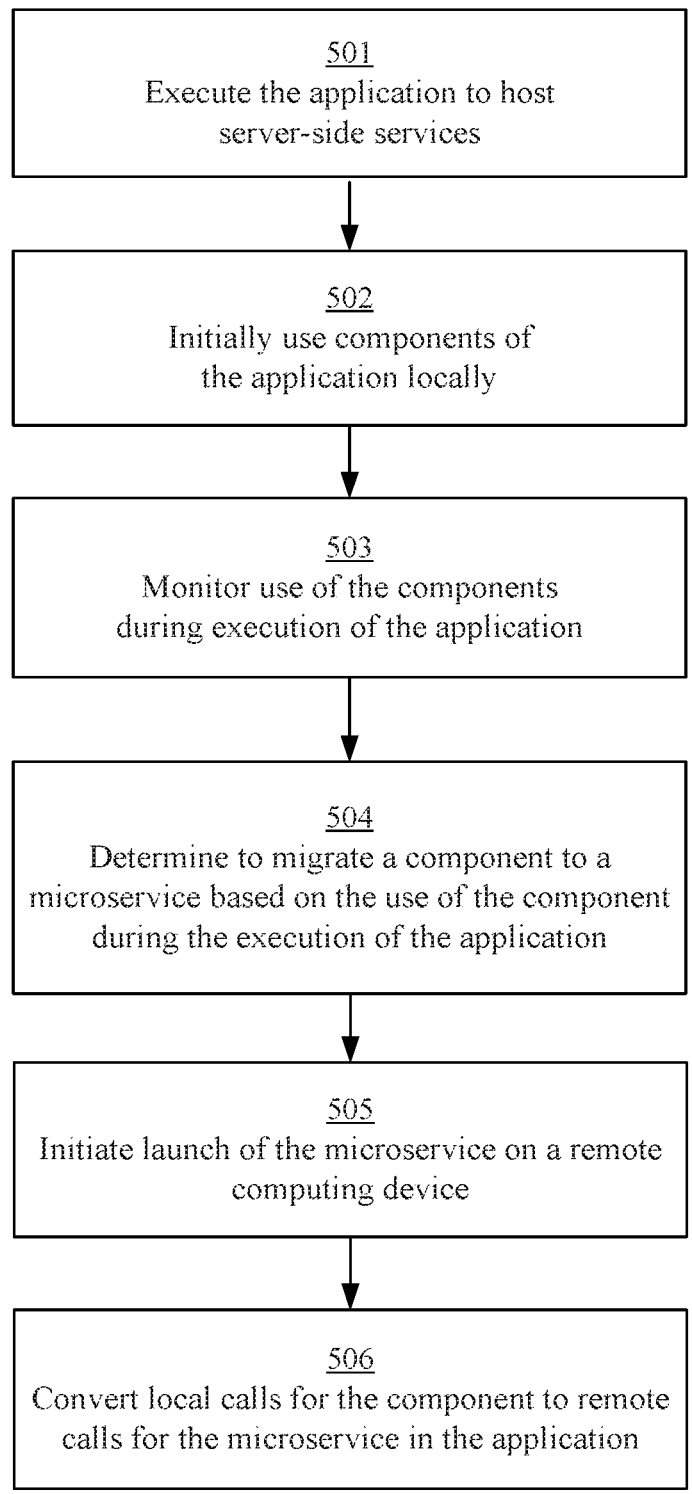
FIG. 5 is a flow chart illustrating another exemplary technique for dynamically scaling application components using microservices.

FIG. 5 is a flow chart illustrating another exemplary technique for dynamically scaling application components using microservices. The exemplary technique 500 can be implemented using servers 203 and 211 of FIG. 2, although other devices and configurations can also be implemented. The exemplary technique 500 can be implemented by storing and executing instructions in a non-transitory computer-readable medium.

Technique 500 involves executing the application to host server-side services, as shown in block 501. The server-side services provide coordinated functions, tasks, or activities via the executing application to one or more users using computing devices as clients. Examples of the server-side services include, but are not limited to, hosting a website, hosting an image, video, or data processing service, hosting a cloud-based file storage service, hosting a cloud-based file sharing service, and/or hosting a cloud-based software tool.

Technique 500 further involves initially using the components of the application locally, as shown in block 502. Thus, initially, in this embodiment of the invention, none of the components are implemented as microservices. In an alternative implementation, one or more of the components are initially implemented as microservices on a remote computing device based, for example, on developer selections and/or previous deployment/execution of the application.

Technique 500 monitors use of the components during execution of the application, as shown in block 503. This can involve monitoring the resources used by the components and comparing the resource usage with predetermined thresholds. Generally, various metrics about the provision of a service by a component, a queue associated with a service provided by the component, the efficiency of the component, a wait time associated with the component and/or any other appropriate metric can be monitored. Such metrics can be compared with a predetermined threshold or other criteria to determine when to migrate a component from a local component to a microservice. In another example, monitoring use of the components alternatively or additionally uses information received from an external analytics or other external system, for example, predictions that usage of the component will exceed a threshold based on analytics data.

Technique 500 next involves determining to migrate a component to a microservice based on the use of the component during the execution of the application, as shown in block 504. For example, if use of the component exceeds a predetermined threshold, the technique 500 can determine to migrate the component to a microservice. In one embodiment, the technique 500 identifies any dependencies of the component to enable launching the microservice. For example, identifying such dependencies can involve identifying a second component upon which the component depends.

Technique 500 next involves initiating launch of the microservice on a remote computing device, as shown in block 505. In one embodiment of the invention, this involves sending a message to the remote computing device with an instruction for the computing device to obtain the appropriate library and launch the component as a microservice.

In one embodiment of the invention, initiating launch of the microservice on the remote computing device involves initiating launch of a library for the component on the remote computing device to expose the component via a network to receive remote calls from the application executing on the computing device.

In the above example in which the first component depends upon a second component, initiating launch of the micro service can involve sending a message to the remote computing device to launch the component and the second component on the remote computing device. This provides a duplicate copy of the second component on the remote computing device for use in providing the microservice on the remote computing device.

Technique 500 further involves converting local calls for the component to remote calls for the microservice in the application, as shown in block 506. In one embodiment of the invention this involves dynamically updating a service registry that is used determine how calls for the component will be treated. The service registry can be changed to identify that local calls to the component are sent to the microservice. Based on the service registry identifying that local calls to the component are sent to the microservice, the technique can direct local calls to the component to a stub that translates the local calls into remote calls sent to the remote computing device for remote processing by the microservice. The component can be, but need not be, removed from the local library on the computing device.

Figure 6:
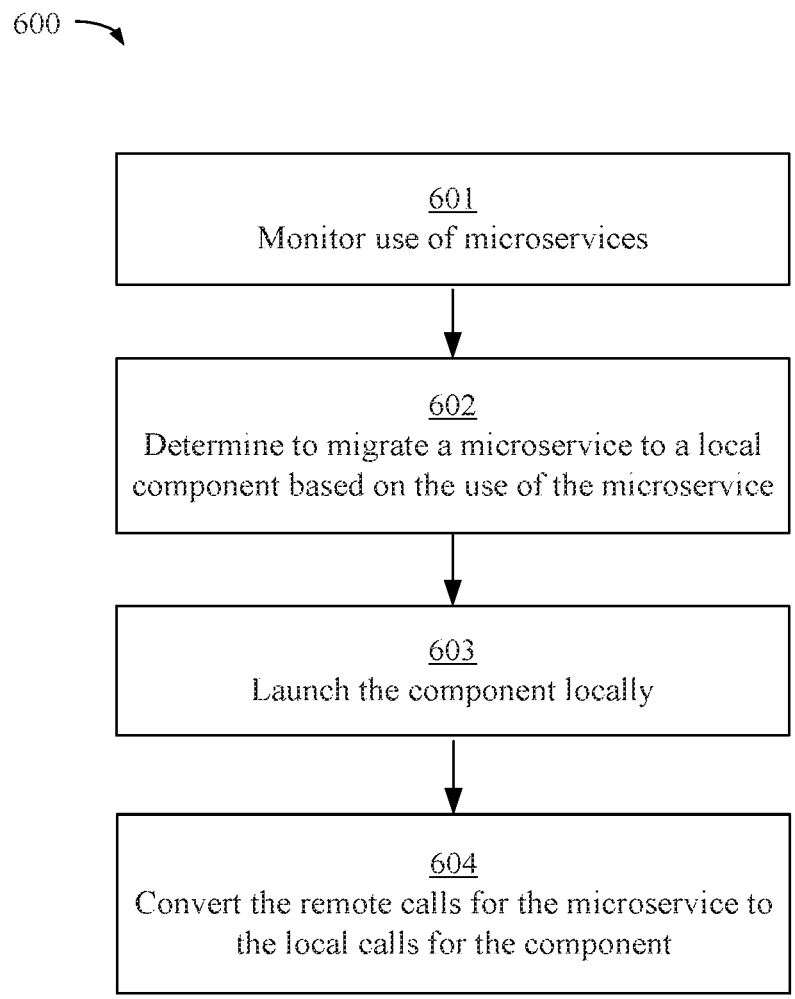
FIG. 6 is a flow chart illustrating an exemplary technique for dynamically converting a remote microservice to a local component.

FIG. 6 is a flow chart illustrating an exemplary technique for dynamically converting a remote microservice to a local component. The exemplary technique 600 can be implemented using servers 203 and 211 of FIG. 2, although other devices and configurations can also be implemented. The exemplary technique 600 can be implemented by storing and executing instructions in a non-transitory computer-readable medium.

The technique 600 involves monitoring use of microservices, as shown in block 601. This can involve monitoring the resources used by the microservices and comparing the resource usage with predetermined thresholds. Generally, various metrics about the provision of a microservice, a queue associated with a microservice, the efficiency of the microservice, a wait time associated with the microservice and/or any other appropriate metric can be monitored. Such metrics can be compared with a predetermined threshold or other criteria to determine when to migrate the microservice to a local component. In one example, this involves monitoring a central processing unit (CPU), other processor, and/or memory usage of the remote computing device to determine how much processing and/or memory the microservice is requiring. In another example, monitoring use of the microservice alternatively or additionally uses information received from an external analytics or other external system, for example, predictions that usage of the micro service will likely soon be reduced below a threshold based on analytics data.

The technique 600 further involves determining to migrate a microservice to a local computing device based on the use of the micro service, as shown in block 602. For example, if the use of the microservice drops below a predetermined threshold, the technique 600 can determine to migrate the microservice.

The technique 600 further involves launching the component locally of the computing device, as shown in block 603. Alternatively, the local component can be left running on the computing device while the microservice is provided on the remote computing device to provide parallel processing. When the microservice is migrated, the microservice is simply turned off so that all processing is done by the local component.

The technique 600 further involves converting the remote calls for the microservice to the local call for the micro service, as shown in block 604. In one embodiment of the invention, this involves dynamically updating a service registry that is used determine how calls for the component will be treated. The service registry can be changed to identify that calls to the component are sent to the local component rather than to the microservice.

Exemplary Implementation Using OSGi Services

One exemplary implementation of the invention scales a JavaScript application uses Open Services Gateway initiative (OSGi) services. The OSGi specification describes a modular system and a service platform for the Java programming language that implements a dynamic component model. OSGi Services are generally local components that can be invoked without the overhead of a remote protocol. OSGi Services provide an additional feature in that they are dynamic and as such can be changed at runtime. Additionally, a technology called OSGi Remote Services can be used to invoke remote services. These remote services can be microservices, i.e., components accessible via a remote protocol such as REST/HTTP or other protocol.

The libraries of components used by OSGi services can be dynamic. This dynamicity allows a remote server to start and/or change a library even while the application is executing. Moreover, by implementing components as OSGi services, the components can be used locally without micro services overhead or can be migrated to micro services. Once components need to be scaled, the OSGi components can be redeployed as remote services on one or more remote computing devices. The service registry of OSGi services can also be dynamically changed to indicate whether calls to a component will be handled by a local component or a remote microservice. These dynamic capabilities allow the components to react to such changes dynamically and use the microservices without the need for code changes.

In order to launch a new microservice, all required runtime dependencies are identified and the new microservice is provisioned with all these dependencies. An OSGi-based technique can inspect the component to be launched, calculate all its dependencies and then launch a new microservice with this set of dependencies. This ensures that the minimal set of code is running on that microservice. Specifically, this can involve using the OSGi Requirements and Capabilities model which allows each component to declare its dependencies, e.g., which other components and capabilities it needs.

Exemplary Computing Environment

Figure 7:
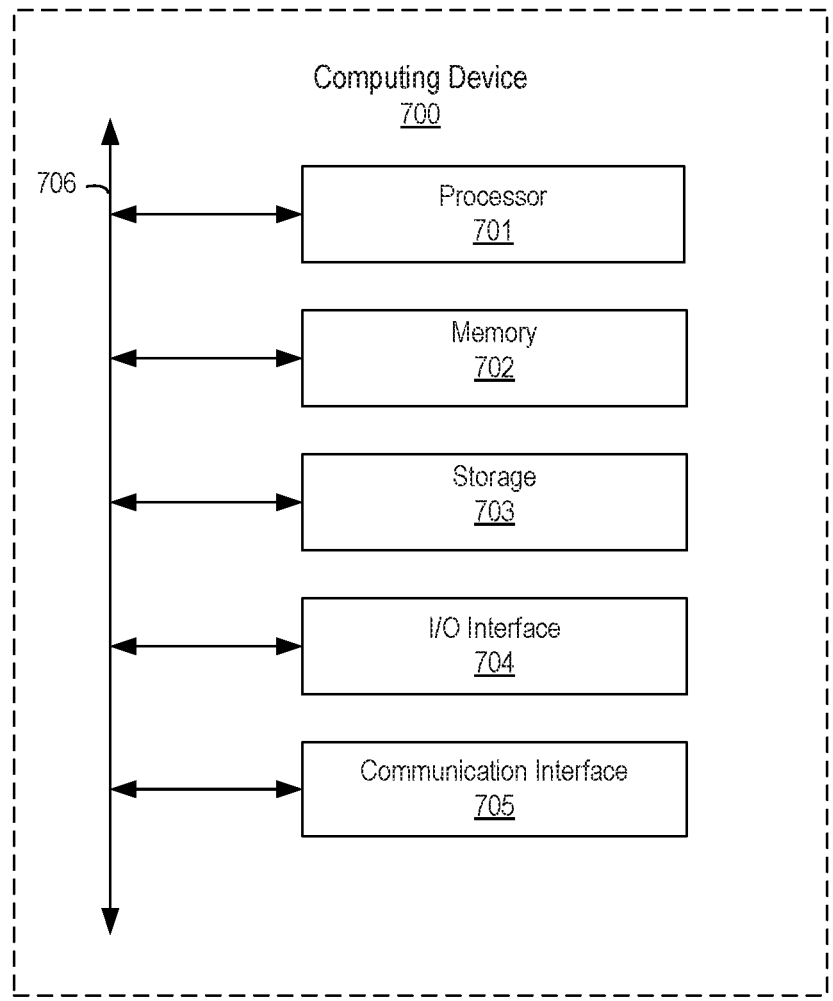
FIG. 7 is a block diagram depicting an example hardware implementation.

Any suitable computing system or group of computing systems can be used to implement the techniques and methods disclosed herein. For example, FIG. 7 is a block diagram depicting examples of implementations of such components. The computing device 70 can include a processor 71 that is communicatively coupled to a memory 72 and that executes computer-executable program code and/or accesses information stored in memory 72 or storage 73. The processor 71 may comprise a microprocessor, an application-specific integrated circuit ("ASIC"), a state machine, or other processing device. The processor 71 can include one processing device or more than one processing device. Such a processor can include or may be in communication with a computer-readable medium storing instructions that, when executed by the processor 71, cause the processor to perform the operations described herein.

The memory 72 and storage 73 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 70 may also comprise a number of external or internal devices such as input or output devices. For example, the computing device is shown with an input/output ("I/O") interface 74 that can receive input from input devices or provide output to output devices. A communication interface 75 may also be included in the computing device 70 and can include any device or group of devices suitable for establishing a wired or wireless data connection to one or more data networks. Non-limiting examples of the communication interface 75 include an Ethernet network adapter, a modem, and/or the like. The computing device 70 can transmit messages as electronic or optical signals via the communication interface 75. A bus 76 can also be included to communicatively couple one or more components of the computing device 70.

The computing device 70 can execute program code that configures the processor 71 to perform one or more of the operations described above. The program code can include one or more modules. The program code may be resident in the memory 72, storage 73, or any suitable computer-readable medium and may be executed by the processor 71 or any other suitable processor. In some embodiments, modules can be resident in the memory 72. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for scaling components of an application using microservices to thereby provide the application, using at least the computing device and a remote computing device, the method comprising:
    executing the application on the computing device, wherein executing the application comprises hosting server-side services using the components of the application locally on the computing device;
    monitoring use of the components during execution of the application;
    determining to migrate a component to a microservice at the remote computing device based on the use of the component during the execution of the application;
    enabling, based on the determining to migrate, a stub corresponding to the component and configured to convert, in the application, local calls for the component into remote calls for the microservice;
    changing a service registry entry of a service registry to reflect the migrating of the component to the microservice at the remote computing device and the enabling of the stub;

initiating launch of the microservice on the remote computing device, including initiating launch of a library for the component on the remote computing device to expose the component via a network to receive remote calls from the application executing on the computing device;

sending a current local call for the component to the stub, based on the service registry entry; and converting, at the stub, the current local call for the component into a current remote call to be sent to the remote computing device for remote processing by the microservice.

2. The method of claim 1 further comprising:

determining to migrate the microservice to the component for use locally on the computing device based on the use of the microservice during the execution of the application;

launching the component on the computing device; and converting the remote calls for the microservice to the local calls for the component in the application.

3. The method of claim 1 further comprising identifying a dependency to enable launching the microservice, wherein identifying the dependency comprises identifying a second component upon which the component depends.

4. The method of claim 3, wherein initiating launch of the microservice comprises sending a message to the remote computing device to launch the component and the second component on the remote computing device.

5. The method of claim 1 further comprising removing a local library for the component on the computing device.

6. The method of claim 1, wherein determining to migrate the component to the microservice comprises determining that an incoming job queue for the component exceeds a threshold.

7. The method of claim 1, wherein determining to migrate the component to the microservice comprises determining that a wait time for the component exceeds a threshold.

8. The method of claim 1, wherein determining to migrate the component to the microservice comprises determining that a number of users using the component exceeds a threshold.

9. The method of claim 1, wherein determining to migrate the component to the microservice comprises determining that a time the component takes to perform a function exceeds a threshold.

10. The method of claim 1, wherein determining to migrate the component to the microservice comprises determining a predicted usage of the component exceeds a threshold, wherein determining the predicted usage comprises receiving analytics data from an analytics system regarding use of the application.

11. The method of claim 1, wherein hosting the server-side services comprises hosting a website, hosting an image, video, or data processing service, hosting a cloud-based file storage service, hosting a cloud-based file sharing service, or hosting a cloud-based software tool.

12. A computing device comprising:

at least one processor;

a non-transitory computer readable storage medium configured to store instructions that, when executed by the at least one processor, cause the at least one processor to execute an application on the computing device;

host server-side services using components of the application locally on the computing device;

migrate a component of the components of the application to a microservice on a remote computing device based on use of the component during execution of the application;

enable, based on the migrating, a stub corresponding to the component and configured to convert, in the application, local calls for the component into remote calls for the microservice;

change a service registry entry of a service registry to reflect the migrating of the component to the microservice at the remote computing device and the enabling of the stub;

initiate launch of the microservice on the remote computing device, including initiating launch of a library for the component on the remote computing device to expose the component via a network to receive remote calls from the application executing on the computing device;

send a current local call for the component to the stub, based on the service registry entry; and convert, at the stub, the current local call for the component into a current remote call to be sent to the remote computing device for remote processing by the microservice.

13. The computing device of claim 12, wherein the instructions, when executed by the at least one processor, are further configured to cause the at least one processor to:

determine to migrate the component to the microservice based on the use of the component.

14. The computing device of claim 12 wherein the instructions, when executed by the at least one processor, are further configured to cause the at least one processor to migrate a second microservice on the remote device to a second component on the computing device.

15. The computing device of claim 14, wherein the instructions, when executed by the at least one processor, are further configured to cause the at least one processor to:

determine to migrate the microservice to the second component for use locally on the computing device based on the use of the microservice during the execution of the application;

launch the second component on the computing device; and convert the remote calls for the microservice to the local calls for the component in the application.

16. A non-transitory computer-readable medium storing instructions, the instructions comprising instructions for:

executing an application on a computing device;

hosting server-side services using components of an application locally on the computing device;

migrating a component of the application to a microservice on a remote computing device based on use of the component during execution of the application;

enabling, based on the migrating, a stub corresponding to the component and configured to convert, in the application, local calls for the component into remote calls for the microservice;

changing a service registry entry of a service registry to reflect the migrating of the component to the microservice at the remote computing device and the enabling of the stub;

initiating launch of the microservice on the remote computing device, including initiating launch of a library for the component on the remote computing device to expose the component via a network to receive remote calls from the application executing on the computing device;

sending a current local call for the component to the stub, based on the service registry entry; and converting, at the stub, the current local call for the component into a current remote call to be sent to the remote computing device for remote processing by the microservice.

17. The non-transitory computer-readable medium of claim 16, wherein migrating the component comprises:
determining to migrate the component to the microservice based on the use of the component.

* * * * *